(12) United States Patent
Kanai

(10) Patent No.: US 12,423,968 B2
(45) Date of Patent: Sep. 23, 2025

(54) METHOD FOR GENERATING IMAGE PROCESSING SEQUENCE, GENERATION DEVICE, AND NON-TRANSITORY COMPUTER-READABLE STORAGE MEDIUM STORING COMPUTER PROGRAM

(71) Applicant: SEIKO EPSON CORPORATION, Tokyo (JP)

(72) Inventor: Masashi Kanai, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 287 days.

(21) Appl. No.: 18/360,258

(22) Filed: Jul. 27, 2023

(65) Prior Publication Data

US 2024/0037928 A1    Feb. 1, 2024

(30) Foreign Application Priority Data

Jul. 29, 2022  (JP) ................................ 2022-121277

(51) Int. Cl.
  *G06V 10/86*    (2022.01)
  *G06T 7/38*    (2017.01)
  *G06V 10/74*    (2022.01)

(52) U.S. Cl.
  CPC ............... *G06V 10/86* (2022.01); *G06T 7/38* (2017.01); *G06V 10/761* (2022.01); *G06T 2207/20081* (2013.01)

(58) Field of Classification Search
  None
  See application file for complete search history.

(56) References Cited

U.S. PATENT DOCUMENTS

2020/0125889 A1* 4/2020 Okamoto ................ G06T 7/001
2021/0166063 A1* 6/2021 Nakamura ............ G06F 18/217

FOREIGN PATENT DOCUMENTS

JP    2007034719 A    2/2007
JP    2007087055 A    4/2007

* cited by examiner

*Primary Examiner* — Leon Viet Q Nguyen
(74) *Attorney, Agent, or Firm* — CHIP LAW GROUP

(57) ABSTRACT

In a method for generating an image processing sequence, when a next routine sequence set is used as a sequence set in a routine of this time, a reference sequence stored in a storage device is compared with each of a plurality of image processing sequences forming a sequence set, and an output image according to the image processing sequence is generated, using a processed image associated with the reference sequence, with respect to a sequence that is the same as the reference sequence and that is formed by an image input layer and a sequence element coupled continuously from the image input layer, of the image processing sequences.

8 Claims, 9 Drawing Sheets

FIG. 4

| FILTER TYPE | NUMBER OF IN- PUTS | NUMBER OF OUT- PUTS | RANGE OF APPEARANCE |
|---|---|---|---|
| FtA | 1 | 1 | $0 \leq VG < 0.167$ |
| FtB | 1 | 1 | $0.167 \leq VG < 0.333$ |
| FtC | 1 | 1 | $0.333 \leq VG < 0.500$ |
| FtD | 2 | 1 | $0.500 \leq VG < 0.667$ |
| FtE | 2 | 1 | $0.667 \leq VG < 0.833$ |
| in | 0 | 1 | $0.833 \leq VG \leq 1.000$ |

|      | No.1  | No.2  | No.3  | No.4  | No.5  | No.6  | ...  | No.10 |
|------|-------|-------|-------|-------|-------|-------|------|-------|
| IV1  | 0.723 | 0.292 | 0.462 | 0.856 | 0.138 | 0.932 | ...  | 1.000 |
| IV2  | 0.314 | 0.742 | 0.112 | 0.412 | 0.995 | 0.366 | ...  | 0.925 |
| ⋮    |       |       |       |       |       |       |      |       |
| IV5  | 0.293 | 0.122 | 0.429 | 0.581 | 0.303 | 0.442 | ...  | 0.586 |

IVGa, IVG

|      | No.1  | No.2  | No.3  | No.4  | No.5  | No.6  | ...  | No.10 |
|------|-------|-------|-------|-------|-------|-------|------|-------|
| IV6  | 0.723 | 0.292 | 0.462 | 0.856 | 0.138 | 0.932 | ...  | 1.000 |
| IV7  | 0.314 | 0.742 | 0.112 | 0.412 | 0.995 | 0.366 | ...  | 0.925 |
| ⋮    |       |       |       |       |       |       |      |       |
| IV10 | 0.723 | 0.292 | 0.462 | 0.856 | 0.995 | 0.366 | ...  | 0.925 |

IVGb

LEARNING IMAGE LM1 ┌88

| REFERENCE NUMBER | REFERENCE DATA |
|---|---|
| 1 | ...... |
| 2 | ...... |
| 3 | ...... |
| ⋮ | ⋮ |

METHOD FOR GENERATING IMAGE PROCESSING SEQUENCE, GENERATION DEVICE, AND NON-TRANSITORY COMPUTER-READABLE STORAGE MEDIUM STORING COMPUTER PROGRAM

The present application is based on, and claims priority from JP Application Serial Number 2022-121277, filed Jul. 29, 2022, the disclosure of which is hereby incorporated by reference herein in its entirety.

BACKGROUND

1. Technical Field

The present disclosure relates to a technique for generating an image processing sequence.

2. Related Art

According to the related art, a technique of expressing an individual structurally like a tree structure, using genetic programming, is known. JP-A-2007-87055 is an example of this technique. Also, according to the related art, a technique of extracting and registering a filter column that is common with other individuals when generating an individual representing an image processing sequence, based on a genetic algorithm, is known. JP-A-2007-34719 is an example of this technique.

In the technique of JP-A-2007-87055, a plurality of image processing sequences are generated by using genetic programming, and the image processing sequences are repeatedly evaluated for each generation. Thus, an image processing sequence satisfying a reference condition is specified. However, in the related-art technique, it may be necessary to generate individuals over many generations until specifying a desired image processing sequence and therefore the processing time until specifying an image processing sequence satisfying a reference condition may become longer. Particularly, when the types of image filters used in the image processing sequence increase or the gene length becomes longer, the processing time until specifying an image processing sequence satisfying a reference condition becomes longer. Also, in the technique of JP-A-2007-34719, image processing is executed using a filter column that is registered in advance, when there is the same filer column. However, the image processing needs to be performed for each image. Therefore, the processing time until specifying an image processing sequence satisfying the reference condition may become longer. Such problems are common to techniques of specifying an image processing sequence satisfying a reference condition, from among a plurality of image processing sequences.

SUMMARY

According to a first aspect of the present disclosure, a method for generating an image processing sequence is provided. The method for generating the image processing sequence includes: (a) generating a sequence set formed of a plurality of image processing sequences, the image processing sequence representing a combination of (i) an image input layer to input an image, (ii) at least one of a plurality of image processing layers, and (iii) an image output layer to output the image after image processing, as sequence elements, the combination varying between the plurality of the image processing sequences; (b) image-processing a learning image according to each of the plurality of the image processing sequences, and generating an output image that is an image after the image processing for each of the plurality of the image processing sequences; (c) comparing the output image and a target image serving as a target associated with the learning image, and calculating an evaluation value indicating a degree of similarity between the output image and the target image, for each of the plurality of the image processing sequences; (d) calculating a temporary evaluation value as an estimate value of the evaluation value for each of the plurality of the image processing sequences generated in the (a), before the (c) of calculating the evaluation value; (e) maintaining the image processing sequence where the degree of similarity indicated by the temporary evaluation value satisfies a predetermined temporary condition, and replacing the image processing sequence that does not satisfy the temporary condition with the image processing sequence that is new, and thus generating a next routine sequence set as the sequence set used in a next routine; (f) storing a reference sequence and a processed image that is image-processed according to the reference sequence, in association with each other in a storage device, the reference sequence being a candidate sequence satisfying a predetermined registration condition, of candidate sequences that are at least a part of the image processing sequence generated in the (a) and that include the image input layer and the image processing layer coupled continuously from the image input layer; and (g) specifying the image processing sequence satisfying a predetermined reference condition, using a plurality of the evaluation values corresponding respectively to the plurality of the image processing sequences. The routine of the (a) to the (g) is repeatedly executed until the image processing sequence satisfying the reference condition is specified. In the (f), the registration condition is a condition that the candidate sequence is a sequence that is the same as a next routine candidate sequence which is at least a part of the image processing sequence forming the next routine sequence set and which includes the image input layer and the image processing layer coupled continuously from the image input layer. In the (b), when the next routine sequence set is used as the sequence set in the routine of this time, the reference sequence stored in the storage device is compared with each of the plurality of the image processing sequences forming the sequence set, and with respect to a sequence that is the same as the reference sequence and that is formed by the image input layer and the sequence element coupled continuously from the image input layer, of the image processing sequences, the output image according to the image processing sequence is generated, using the processed image associated with the reference sequence.

According to a second aspect of the present disclosure, a generation device for an image processing sequence is provided. The generation device includes: a sequence generation unit generating a sequence set formed of a plurality of image processing sequences, the image processing sequence representing a combination of (i) an image input layer to input an image, (ii) at least one of a plurality of image processing layers, and (iii) an image output layer to output the image after image processing, as sequence elements, the combination varying between the plurality of the image processing sequences; an image processing unit image-processing a learning image according to each of the plurality of the image processing sequences, and generating an output image that is an image after the image processing for each of the plurality of the image processing sequences; an evaluation value calculation unit comparing the output image and a target image serving as a target associated with the learning image, and calculating an evaluation value indicating a degree of similarity between the output image and the target image, for each of the plurality of the image processing sequences; and a temporary evaluation value calculation unit calculating a temporary evaluation value as an estimate value of the evaluation value for each of the plurality of the image processing sequences. The sequence generation unit maintains the image processing sequence where the degree of similarity indicated by the temporary evaluation value satisfies a predetermined temporary condition, and replaces the image processing sequence that does not satisfy the temporary condition with the image processing sequence that is new, and thus generates a next routine sequence set as the sequence set used in a next routine. The generation device also includes: a registration unit storing a reference sequence and a processed image that is image-processed according to the reference sequence, in association with each other in a storage device, the reference sequence being a candidate sequence satisfying a predetermined registration condition, of candidate sequences that are at least a part of the image processing sequence forming the sequence set generated by the sequence generation unit and that include the image input layer and the image processing layer coupled continuously from the image input layer; and a specification unit specifying the image processing sequence satisfying a predetermined reference condition, using the evaluation values corresponding respectively to the plurality of the image processing sequences. The registration condition is a condition that the candidate sequence is a sequence that is the same as a next routine candidate sequence which is at least a part of the image processing sequence forming the next routine sequence set and which includes the image input layer and the image processing layer coupled continuously from the image input layer. When the next routine sequence set is used as the sequence set in the routine of this time, the image processing unit compares the reference sequence stored in the storage device with each of the plurality of the image processing sequences forming the sequence set, and generates the output image according to the image processing sequence, using the processed image associated with the reference sequence, with respect to a sequence that is the same as the reference sequence and that is formed by the image input layer and the sequence element coupled continuously from the image input layer, of the image processing sequences.

According to a third aspect of the present disclosure, a non-transitory computer-readable storage medium storing a computer program is provided. The computer program causes a computer to execute: (a) a function of generating a sequence set formed of a plurality of image processing sequences, the image processing sequence representing a combination of (i) an image input layer to input an image, (ii) at least one of a plurality of image processing layers, and (iii) an image output layer to output the image after image processing, as sequence elements, the combination varying between the plurality of the image processing sequences; (b) a function of image-processing a learning image according to each of the plurality of the image processing sequences, and generating an output image that is an image after the image processing for each of the plurality of the image processing sequences; (c) a function of comparing the output image and a target image serving as a target associated with the learning image, and calculating an evaluation value indicating a degree of similarity between the output image and the target image, for each of the plurality of the image processing sequences; (d) a function of calculating a temporary evaluation value as an estimate value of the evaluation value for each of the plurality of the image processing sequences generated by the function (a), before executing the function (c) of calculating the evaluation value; (e) a function of maintaining the image processing sequence where the degree of similarity indicated by the temporary evaluation value satisfies a predetermined temporary condition, and replacing the image processing sequence that does not satisfy the temporary condition with the image processing sequence that is new, and thus generating a next routine sequence set as the sequence set used in a next routine; (f) a function of storing a reference sequence and a processed image that is image-processed according to the reference sequence, in association with each other in a storage device, the reference sequence being a candidate sequence satisfying a predetermined registration condition, of candidate sequences that are at least a part of the image processing sequence generated by the function (a) and that include the image input layer and the image processing layer coupled continuously from the image input layer; and (g) a function of specifying the image processing sequence satisfying a predetermined reference condition, using a plurality of the evaluation values corresponding respectively to the plurality of the image processing sequences. The routine of the function (a) to the function (g) is repeatedly executed until the image processing sequence satisfying the reference condition is specified. In the function (f), the registration condition is a condition that the candidate sequence is a sequence that is the same as a next routine candidate sequence which is at least a part of the image processing sequence forming the next routine sequence set and which includes the image input layer and the image processing layer coupled continuously from the image input layer. When the next routine sequence set is used as the sequence set in the routine of this time, the function (b) compares the reference sequence stored in the storage device with each of the plurality of the image processing sequences forming the sequence set, and generates the output image according to the image processing sequence, using the processed image associated with the reference sequence, with respect to a sequence that is the same as the reference sequence and that is formed by the image input layer and the sequence element coupled continuously from the image input layer, of the image processing sequences.

BRIEF DESCRIPTION OF THE DRAWINGS

FIG. 4 explains a gene table.

FIG. 5 explains population data generated in one routine.

DESCRIPTION OF EXEMPLARY EMBODIMENTS

A. Embodiment

Figure 1:
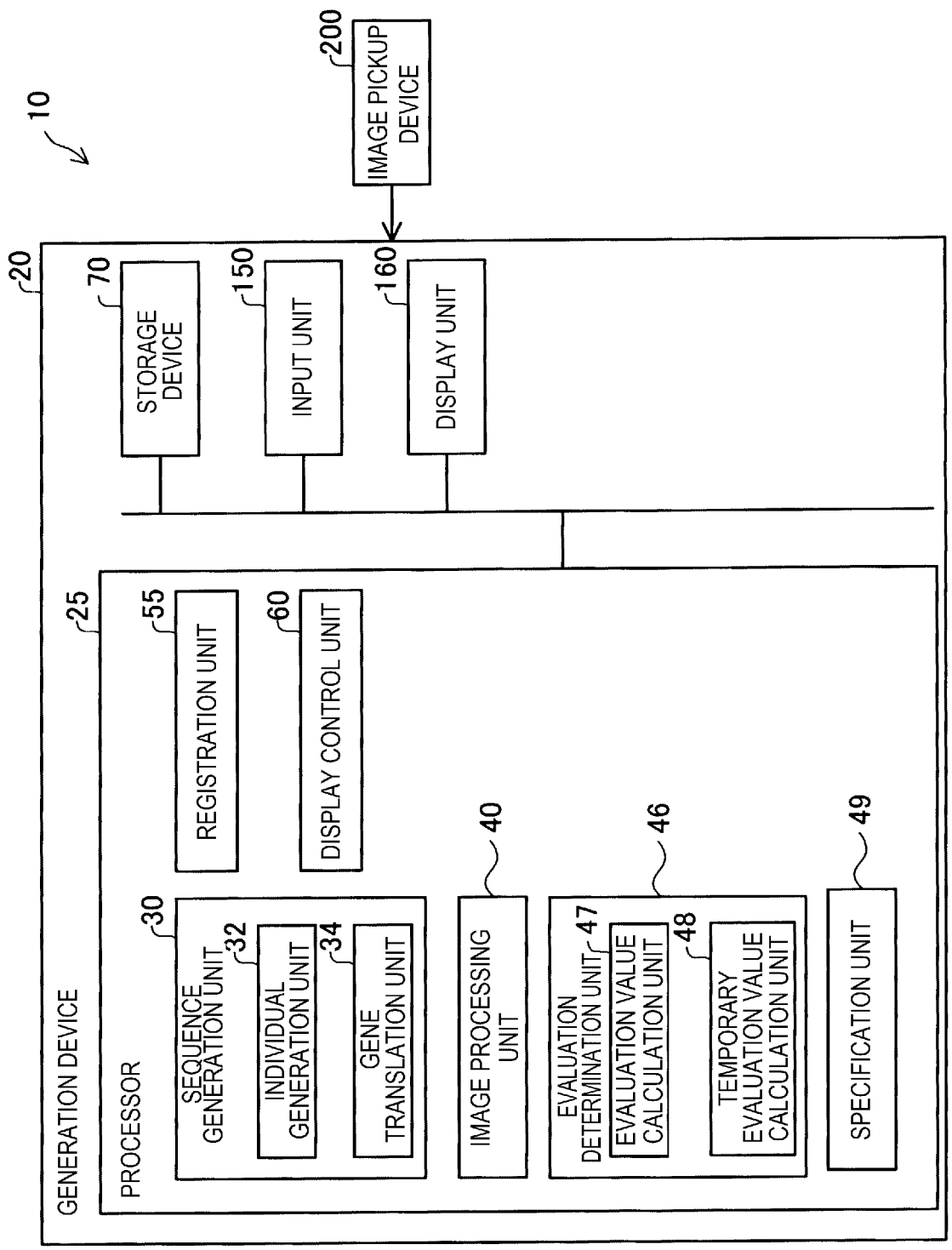
FIG. 1 explains a generation system according to an embodiment.

FIG. 1 explains a generation system 10 according to an embodiment. The generation system 10 has a generation device 20 and an image pickup device 200. The generation device 20 and the image pickup device 200 can transmit and receive data to and from each other via a wire or wirelessly. The image pickup device 200 is a camera. The image pickup device 200 picks up an image of a subject and acquires a picked-up image. The picked-up image acquired by the image pickup device 200 is transmitted to the generation device 20.

The generation device 20 has a sequence generation processing function of generating a specified image processing sequence DSq for acquiring a desired image after image processing, and an image processing function of image-processing an image according to the specified image processing sequence DSq generated by the sequence generation processing function, and thus outputting a processed image. The generation device 20 in this embodiment automatically generates the specified image processing sequence DSq for acquiring an image to achieve a desired objective, based on the picked-up image. For example, the generation device 20 image-processes an image of a circuit board, which is an industrial product, picked up by the image pickup device 200, using the specified image processing sequence DSq, and thus outputs a binarized image where a defect part is expressed as a black image whereas the other parts are expressed as a white image, as the processed image. Based on the binarized image, a user or a device specifies whether there is a defect part or not, and the location of a defect part if any. An inspection of the industrial product is thus carried out.

The sequence generation processing function generates a plurality of image processing sequences Sq, using genetic programming. The sequence generation processing function also specifies the specified image processing sequence DSq for acquiring a desired image after image processing, from among the plurality of image processing sequences Sq thus generated. In this embodiment, the sequence generation processing function and the image processing function are installed in one generation device 20. However, this is not limiting. In another embodiment, the sequence generation processing function and the image processing function may be installed in separate devices or may be present on a cloud.

The generation device 20 is an electronic computer such as a personal computer. The generation device 20 has a processor 25, a storage device 70, an input unit 150, and a display unit 160. The processor 25 executes various programs stored in the storage device 70 and thus controls operations of the generation device 20. Detailed functions of the processor 25 will be described later. The storage device 70 is formed of a memory such as a RAM or a ROM. The storage device 70 stores various programs for implementing each function of the processor 25, and various data used to generate the image processing sequence Sq. Details of the storage device 70 will be described later. The input unit 150 is an interface accepting information from outside. For example, the input unit 150 accepts an input of a picked-up image from the image pickup device 200 and accepts an input of an image generated by the user using another device. The display unit 160 displays various information. The display unit 160 is, for example, a liquid crystal monitor.

The processor 25 executes various programs in the storage device 70 and thus functions as a sequence generation unit 30, an image processing unit 40, an evaluation determination unit 46, a specification unit 49, a registration unit 55, and a display control unit 60. Apart of the functions executed by the processor 25 may be implemented by a hardware circuit. In the present disclosure, the "processor" is a term including CPU and GPU.

The sequence generation unit 30 generates a sequence set formed of a plurality of image processing sequences Sq having different combinations of sequence elements from each other, by structurally expressing a gene sequence represented by an individual IV like a tree structure. The image processing sequence Sq is expressed by a combination of a plurality of sequence elements. The sequence elements include (i) an image input layer, which is a node to input an image, (ii) an image processing layer as an image processing filter, which is an intermediate node between the image input layer and an image output layer, and (iii) the image output layer, which is a node to output an output image PM, which is an image after image processing, that is, after final image processing.

The sequence generation unit 30 has an individual generation unit 32 and a gene translation unit 34. The individual generation unit 32 generates an individual IV formed of a plurality of genes sequenced one-dimensionally or two-dimensionally. The genes forming the individual IV are numerical values indicating the image input layer and the type of the image processing layer, in this embodiment, the image processing filter. The image input layer and a different image processing filter are allocated to each numerical range. That is, the individual IV is generated by sequencing genes corresponding to the image input layer and the image processing layer, respectively. The individual generation unit 32 generates a predetermined number of individuals IV for each generation G.

In this embodiment, the individual generation unit 32 sequences genes one-dimensionally and thus generates an individual IV having a predetermined gene length. The combination of sequence elements of a plurality of image processing sequences Sq varies from one generation G to another. In one routine in the generation processing for the specified image processing sequence DSq, the individual generation unit 32 generates a first type population IVGa as a population formed of a plurality of individuals IV, and a second type population IVGb as a population formed of a plurality of individuals IV. The first type population IVGa is a population representing a sequence set formed of a plurality of image processing sequences Sq for calculating an evaluation value EV, described later. The second type population IVGb is a population representing a next routine sequence set as a sequence set formed of a plurality of image processing sequences Sq for calculating the evaluation value EV in the next routine. The second type population IVGb is handled as the first type population IVGa in the next routine. As described above, the individual generation unit 32 generates populations IVG of two generations, that is, the first type population IVGa, which is the population IVG of the current generation Gm, and the second type population IVGb, which is the population of the next generation Gn, in one routine.

In each routine repeated in the generation processing to generate the specified image processing sequence DSq, the image processing sequence Sq represented by the individuals IV of the first type population IVGa is also referred to as an evaluation subject image processing sequence Sqa, and the image processing sequence Sq represented by the second type population IVGb is also referred to as a next routine image processing sequence Sqb.

For the first type population IVGa of the very first generation in the first routine, the individual generation unit 32 uses one of a first method and a second method, described below. The first method is to randomly arrange numerical values down to the third decimal place from 0 to 1 as genes in loci of an individual IV and thus generate population data 84 formed of a plurality of individuals IV. The second method is to use, as the population data 84, a plurality of individuals IV representing a plurality of image processing sequences Sq generated in the past generation processing for the specified image processing sequence DSq.

The second type population IVGb in the first routine and from the second routine onward is generated, based on the first type population IVGa generated in the same routine. Specifically, the individual generation unit 32 newly generates an individual IV, using at least one of the techniques of crossover and mutation, and replication, to an individual forming the first type population IVGa, and thus generates each individual IV of the second type population IVGb. That is, each of a plurality of image processing sequences Sq forming the next routine sequence set represented by the second type population IVGb is generated by replication, crossover, or mutation, based on a plurality of evaluation subject image processing sequences Sqa forming the sequence set represented by the first type population IVGa.

The gene translation unit 34 refers to a gene table 82, described later, that is stored in the storage device 70, thus translates each gene of the individual IV, and generates the image processing sequence Sq expressed as a tree structure. The gene table 82 is a table prescribing the image processing filter corresponding to each numerical range of the numerical value of a gene, and the coupling relationship between the sequence elements.

The image processing unit 40 inputs each of a plurality of learning images LM of learning data 74, descried later, which is stored in the storage device 70, to the image input layer and image-processes the learning image LM according to each of a plurality of evaluation subject image processing sequences Sqa of the first type population IVGa generated by the gene translation unit 34. The image processing unit 40 then outputs an output image PM, which is an image after the image processing according to each of the plurality of evaluation subject image processing sequence Sqa, from the image output layer and thus generates the output image PM. The image processing unit 40 also inputs an inspection subject image to the image input layer and image-processes the inspection subject image, using the specified image processing sequence DSq stored in the storage device 70, and outputs an output image PM, which is an image after the image processing, from the image output layer and thus generates the output image PM.

The evaluation determination unit 46 has an evaluation value calculation unit 47 and a temporary evaluation value calculation unit 48. The evaluation value calculation unit 47 compares the output image PM generated by the image processing unit 40 and a target image TM associated with the learning image LM serving as the base of the output image PM, for each of the plurality of evaluation subject image processing sequences Sqa of the first type population IVGa. The evaluation value calculation unit 47 then calculates an evaluation value EV indicating a degree of similarity SD as the result of the comparison between the output image PM and the target image TM. When a plurality of learning images LM are image-processed according to one evaluation subject image processing sequence Sqa and a plurality of output images PM are thus generated, the evaluation value calculation unit 47 calculates the evaluation value EV corresponding to each output image PM and calculates a statistic of the evaluation values EV as the final evaluation value EV. As the statistic of the evaluation values EV, a value such as the average value or the median value is used. In this embodiment, the average value is used as the statistic.

The evaluation value EV may be an index value indicating the degree of similarity SD between two images. For example, one of the mean squared error (MSE), the peak signal-to-noise ratio (PSNR), and the structural similarity (SSIM) can be used. When the MSE is used as the evaluation value EV, the degree of similarity SD between the output image PM and the target image TM becomes higher as the MSE value becomes lower. That is, the reciprocal of the MSE indicates the degree of similarity SD. When the PSNR is used as the evaluation value EV, the degree of similarity SD between the output image PM and the target image TM becomes higher as the PSNR becomes higher. That is, the PSNR indicates the degree of similarity SD. When the SSIM is used, for example, an image is divided into small areas and the MSSIM (mean SSIM), which is the average value of the SSIM calculated for each small area, is used as the evaluation value EV. When the MSSIM is used as the evaluation value EV, the degree of similarity SD becomes higher as the MSSIM becomes higher. That is, the MSSIM indicates the degree of similarity SD. The "degree of similarity SD" may also be referred to as the "similarity degree SD".

The temporary evaluation value calculation unit 48 calculates a temporary evaluation value PEV as an estimate value of the evaluation value EV for each of the plurality of evaluation subject image processing sequences Sqa, before the image processing of the learning image LM is executed using the plurality of evaluation subject image processing sequences Sqa. The temporary evaluation value calculation unit 48 does not generate the output image PM, based on the evaluation subject image processing sequence Sqa, but predicts and calculates the temporary evaluation value PEV indicating the degree of similarity SD between a predicted output image PM and the target image TM. When calculating the temporary evaluation value PEV in the first routine of the generation processing to generate the specified image processing sequence DSq, that is, in the evaluation subject image processing sequence Sqa in the first generation G, the temporary evaluation value calculation unit 48 calculates the temporary evaluation value PEV by one of a first calculation method and a second calculation method, described below. Thus, the temporary evaluation value PEV in the first routine can be easily set.

The first calculation method is to set a random value within a predetermined range, as the temporary evaluation value PEV. The predetermined range is set to be a range which the evaluation value EV can fall within. When the first calculation method is used, the sequence generation unit 30 in the first routine randomly generates the evaluation subject image processing sequence Sqa, using the first method of randomly arranging numerical values down to the third decimal place from 0 to 1 as genes in the loci of each individual IV of the first type population IVGa.

The second calculation method is to set, as the temporary evaluation value PEV, a past evaluation value LEV, which is the evaluation value EV calculated by the evaluation value calculation unit 47 in the generation processing based on the sequence generation method for the specified image processing sequence DSq executed in the past. In this case, the sequence generation unit 30 in the first routine generates the first type population IVGa, using the second method of generating each individual IV representing the image processing sequence Sq for which the past evaluation value LEV is calculated in the generation processing executed when generating the specified image processing sequence DSq in the past.

Meanwhile, when calculating the temporary evaluation value PEV for the evaluation subject image processing sequence Sqa represented by the individual IV of the first type population IVGa from the second routine onward of the generation processing executed in the generation method for generating the specified image processing sequence DSq, the temporary evaluation value calculation unit 48 executes the calculation processing described below. That is, in the calculation processing, the temporary evaluation value calculation unit 48 calculates the temporary evaluation value PEV, using the evaluation value EV calculated by the evaluation value calculation unit 47, based on each evaluation subject image processing sequence Sqa in the previous routine. For example, the temporary evaluation value calculation unit 48 calculates the temporary evaluation value PEV, using (i) a previous evaluation value EVM as the evaluation value EV calculated in the previous routine, and (ii) the rate of coincidence between a previous image processing sequence Sqam as the evaluation subject image processing sequence Sqa serving as the base of calculation of the evaluation value EV calculated in the previous routine and a current image processing sequence Sqan, which is the evaluation subject image processing sequence Sqa for which the temporary evaluation value PEV is to be calculated. The specific formula for this calculation will be described later.

From the second routine onward, the temporary evaluation value calculation unit 48 may add a random value to the calculated temporary evaluation value PEV and thus may calculate the final temporary evaluation value PEV. The random value is selected from a predetermined range. Adding the random value can restrain the discrepancy between the temporary evaluation value PEV and the evaluation value EV.

The specification unit 49 specifies an evaluation subject image processing sequence Sqa satisfying a predetermined registration condition, as the specified image processing sequence DSq, using a plurality of evaluation values EV corresponding respectively to a plurality of evaluation subject image processing sequences Sqa. When the evaluation value EV is calculated for a plurality of learning sets SM with respect to each evaluation subject image processing sequence Sqa, a statistic of the evaluation values EV is used as the final evaluation value EV. The statistic may be the average value, the median value, the mode value, the maximum value or the like. In this embodiment, the statistic of the evaluation values EV is the average value. Also, when the degree of similarity SD indicated by the final evaluation value EV, which is the statistic, is equal to or higher than a predetermined threshold, the specification unit 49 determines that a reference condition is satisfied. Specifically, when the final evaluation value EV is such a value that the degree of similarity SD is equal to or higher than the threshold, the specification unit 49 determines that the reference condition is satisfied. In this embodiment, when the final evaluation value EV is equal to or higher than an evaluation reference value, the degree of similarity SD is equal to or higher than the threshold and therefore the specification unit 49 determines that the reference condition is satisfied.

The registration unit 55 compares the evaluation subject image processing sequence Sqa with the next routine image processing sequence Sqb, thus generates reference data, and registers the reference data in a reference table 88. The registration unit 55 may generate the reference data by comparing the individual IV representing the evaluation subject image processing sequence Sqa with the individual IV representing the next routine image processing sequence Sqb or may generate the reference data by comparing the image processing sequences Sqa, Sqb translated by the gene translation unit 34. The reference table 88 stores data to be used when image-processing the learning image LM, using the next routine image processing sequence Sqb in the previous routine as the evaluation subject image processing sequence Sqa in the next routine. The reference table 88 is prescribed, for example, for each learning image LM. Details of the reference table 88 will be described later.

The display control unit 60 causes the display unit 160 to display various information. The display control unit 60 causes the display unit 160 to display, for example, the specified image processing sequence DSq, the processed image which is image-processed according to the image processing sequence Sq represented by the individual IV, the target image TM, and the evaluation value EV.

Figure 2:
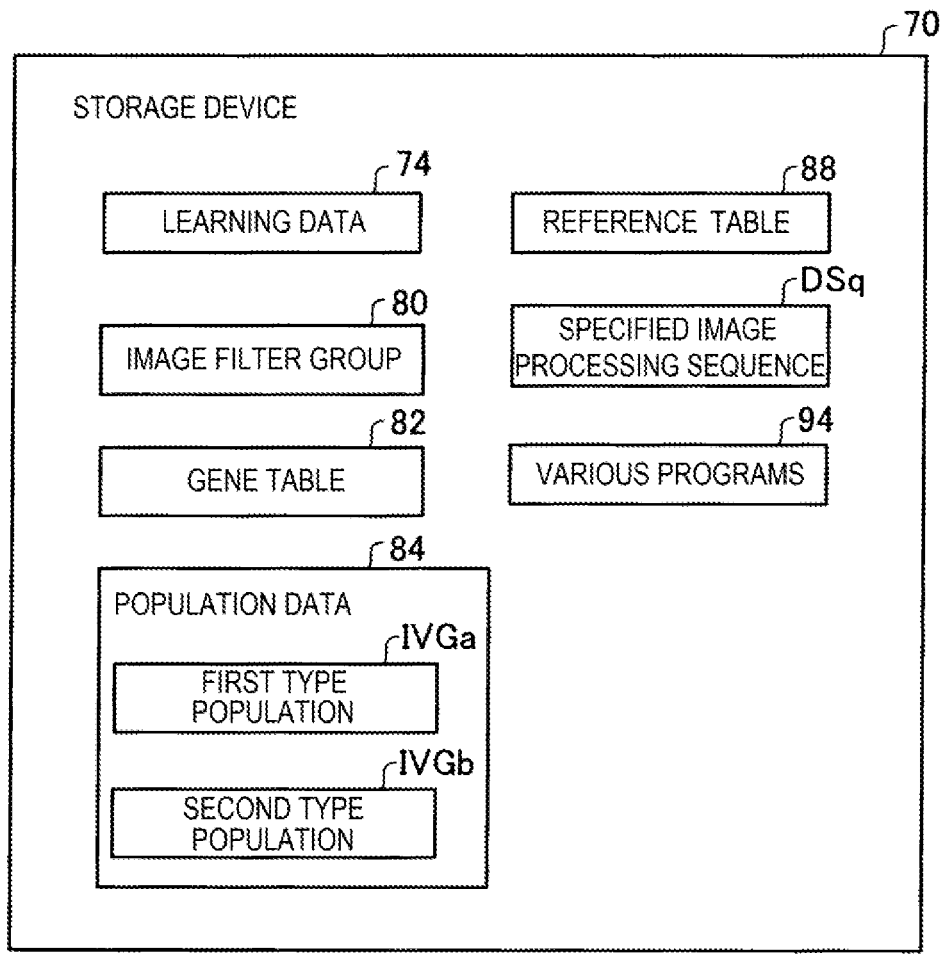
FIG. 2 explains a storage device.

FIG. 2 explains the storage device 70. The storage device 70 stores the learning data 74, an image filter group 80, the gene table 82, the population data 84, the reference table 88, the specified image processing sequence DSq, and various programs 94. The specified image processing sequence DSq is the image processing sequence Sq determined as satisfying a predetermined reference condition by the evaluation value calculation unit 47. The specified image processing sequence DSq is expressed, for example, by layer identifiers identifying a plurality of image processing filters, which are a plurality of image processing layers, and the order of the layer identifiers, that is, the coupling relationship. The various programs 94 are programs executed by the processor 25.

Figure 3:
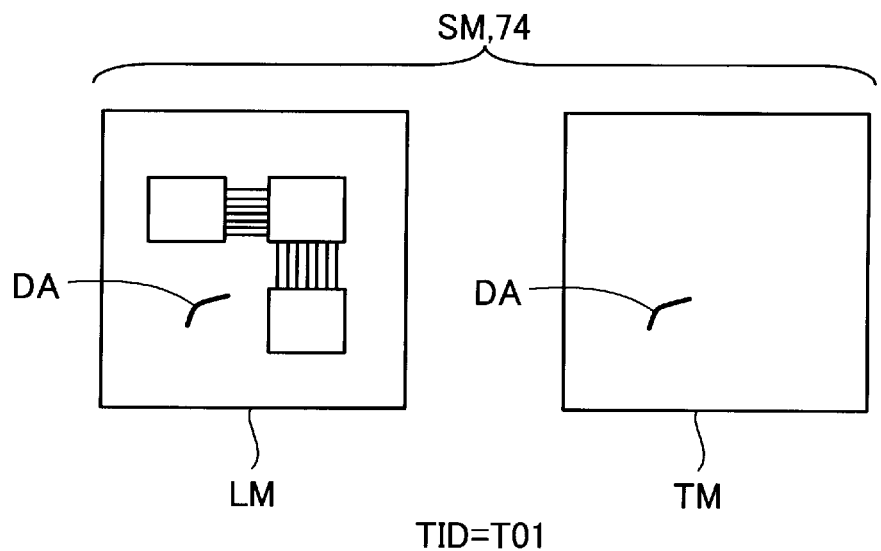
FIG. 3 shows an example of a learning data.

FIG. 3 shows an example of the learning data 74. The learning data 74 has a plurality of learning sets SM, each learning set SM being formed of (i) a learning image LM, which is a subject of image processing according to the image processing sequence Sq, and (ii) a desired target image TM associated with the learning image LM. The learning image LM is, for example, an image of a circuit board, which is an industrial product. The target image TM is, for example, a binarized image where a defect part DA is expressed as a black image whereas the other parts are expressed as a white image. The target image TM is generated, for example, by the user setting the defect part DA to be a black image and setting the other parts to be a white image, with reference to the learning image LM where the position of the defect part is specified in advance. The plurality of learning sets SM are formed of a plurality of learning sets SM having the learning image LM with the defect part DA, and a plurality of learning sets SM having the learning image LM representing a good-quality product, which is an image without including the defect part DA. The plurality of learning images LM are images of circuit boards of the same type with different serial numbers, picked up by the image pickup device 200. Each learning set SM is given an identification number TID. The learning set SM shown in FIG. 3 is given "T01" as the identification number TID.

The image filter group 80 shown in FIG. 2 is an aggregate of a plurality of image filters to be candidates for the sequence elements of the image processing sequence Sq. The image filter may be an average value filter, a maximum value filter, a minimum value filter, a binary value filter, a moving average filter, a Laplacian filter, a Gaussian filter, a Sobel filter, a gamma correction filter, a filter that combines two images together into one image, and the like. Image processing filters of the same type having different kernel sizes or coefficients from each other are stored as different image processing filters in the image filter group 80.

The gene table 82 is a table showing the coupling relationship between candidate sequence elements of the image processing sequence Sq, and the correspondence with the type of the image processing filter corresponding to the numerical value represented by the gene.

FIG. 4 explains the gene table 82. In the description below, to facilitate the understanding, it is assumed that the image filter group 80 is formed of five image processing filters FtA to FtE. In practice, more than five image processing filters are stored in the image processing filter group. In the gene table 82, the number of inputs, the number of outputs, and the range of appearance are prescribed for each filter type representing the type of the image processing filter. The filter type is an identifier identifying each image processing filter of the image filter group 80, or the image input layer. In FIG. 4, the image input layer is represented by a filter type "in". The number of inputs represents the number of sequence elements coupled to the input side of the image processing filter or the image input layer. When the number of inputs is "2", data outputted from two sequence elements are inputted to the image processing filter. The number of outputs represents the number of sequence elements coupled to the output side of the image processing filter. In this embodiment, all the numbers of outputs are "1" and the image processing layer and the image input layer are coupled to one output-side sequence element.

The range of appearance in the gene table 82 prescribes the range of a numerical value VG of the gene. In this embodiment, the numerical values from 0 to 1 are evenly divided into six parts so that the image processing filters appear randomly at substantially equal probabilities in the image processing sequence Sq. For example, when the numerical value VG of the gene is a value equal to or greater than 0 and smaller than 0.167, the image processing filter FtA is allocated to this gene.

The population data 84 shown in FIG. 2 has the first type population IVGa and the second type population IVGb in one routine generated by the individual generation unit 32. FIG. 5 explains the population data 84 generated in one routine. In this embodiment, an example where ten individuals IV are generated in one generation G is described. In each of the individuals IV1 to IV10, a plurality of loci where genes are arranged are sequenced one-dimensionally. The individuals IV1 to IV10 have the same gene length. Each of the individuals IV1 to IV10 is formed by sequencing genes in order at the loci of No. 1 to No. 10. The individual generation unit 32 arranges a gene expressed by a numerical value down to the third decimal place from 0 to 1, at each locus. That is, in this embodiment, the value that a gene can have at each locus is a numerical value equal to or greater than 0 and equal to or smaller than 1 and down to the third decimal place.

Figures 6, 7:
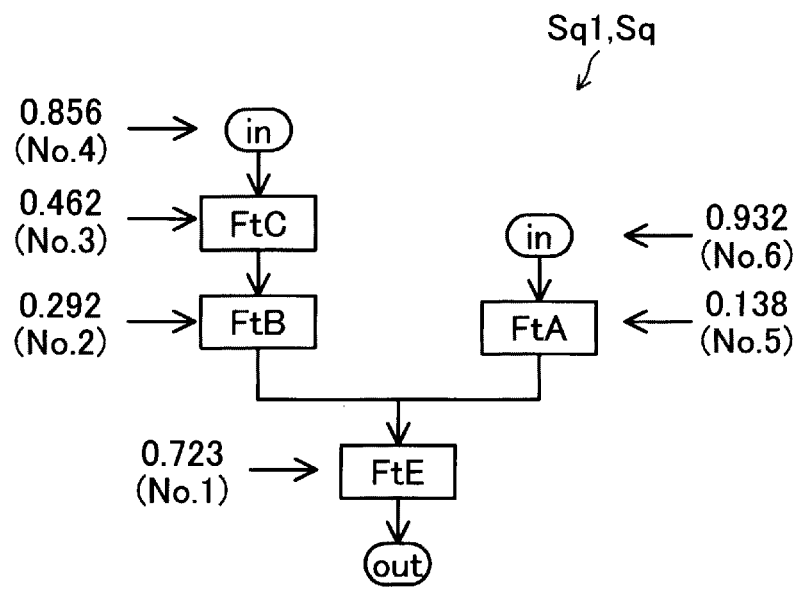
FIG. 6 shows a tree-structured image processing sequence.
FIG. 7 shows a reference table.

Before explaining FIG. 2 further, the processing of generating the image processing sequence Sq by the gene translation unit 34 will be described, using FIG. 6. FIG. 6 shows the image processing sequence Sq having a tree structure generated by the gene translation unit 34. The image processing sequence Sq shown in FIG. 6 is an image processing sequence Sq1 generated based on the individual IV1 shown in FIG. 5.

The gene translation unit 34 generates the image processing sequence Sq having a tree structure in order from the side of an image output layer "out", using the individual IV, the gene table 82, and the image filter group 80. First, the gene translation unit 34 sets the image output layer "out" as a terminal node and couples the sequence elements in the order of sequence of the genes of the individual IV. The coupling of the sequence elements is executed according to a predetermined coupling rule. In this embodiment, the image processing sequence Sq is generated according to a rule such that the sequence elements are arranged preferentially from the terminal node side in the order of sequence of the genes and preferentially at the coupling point on the left side shown in FIG. 6 over the coupling point on the right side. That is, the image processing layer or the image input layer "in" is arranged from the side of the image output layer "out" in the order of sequence of the genes, and when the input side is divided into a plurality of sections, the left side is prioritized until the left-side sequence becomes the image input layer "in". In this embodiment, the number of inputs of the image output layer "out" is preset to be "1".

The gene translation unit 34 refers to "0.723", which is the numerical value VG of the gene of No. 1 of the individual IV1, and the gene table 82, and thus specifies that "0.723" is within the range of appearance of the image processing filter FtE. Thus, the image processing filter FtE is coupled to the input side of the image output layer "out". Next, the gene translation unit 34 specifies that the number of inputs of the image processing filter FtE is "2", referring to the gene table 82, and thus arranges two sequence elements at the input side of the image processing filter FtE. Specifically, the gene translation unit 34 arranges the sequence element corresponding to the gene of No. 2 of the individual IV1, at the input-side coupling point on the left side shown in FIG. 6. That is, the gene translation unit 34 refers to "0.292", which is the numerical value VG of the gene of No. 2, and the gene table 82, and thus specifies that "0.292" is within the range of appearance of the image processing filter FtB. Thus, the image processing filter FtB is arranged at the input-side coupling point on the left side of the image processing filter FtE.

Next, the gene translation unit 34 specifies that the number of inputs of the image processing filter FtB is "1", referring to the image processing filter FtB represented by the gene of No. 2 and the gene table 82, and thus arranges one sequence element at the input side of the image processing filter FtB. Specifically, the gene translation unit 34 refers to "0.462", which is the numerical value VG of the gene of No. 3, and the gene table 82, and thus specifies that "0.462" is within the range of appearance of the image processing filter FtC. Thus, the image processing filter FtC is arranged at the input-side coupling point of the image processing filter FtB represented by the gene of No. 2.

Next, the gene translation unit 34 specifies that the number of inputs of the image processing filter FtC is "1", referring to the image processing filter FtC represented by the gene of No. 3 and the gene table 82, and thus arranges one sequence element at the input side of the image processing filter FtC. Specifically, the gene translation unit 34 refers to "0.856", which is the numerical value VG of the gene of No. 4, and the gene table 82, and thus specifies that "0.856" is within the range of appearance of the image input layer "in". Thus, the image input layer "in" is arranged at the input-side coupling point of the image processing filter FtC represented by the gene of No. 3. Then, the generation of the sequence on the left side of the image processing sequence Sq shown in FIG. 6 ends.

Subsequently, the gene translation unit 34 arranges the sequence element corresponding to the gene of No. 5 of the individual IV1, at the input-side coupling point on the right side shown in FIG. 6. That is, the gene translation unit 34 refers to "0.138", which is the numerical value VG of the gene of No. 5, and the gene table 82, and thus specifies that "0.138" is within the range of appearance of the image processing filter FtA. Thus, the image processing filter FtA is arranged at the input-side coupling point on the right side of the image processing filter FtE.

Also, the gene translation unit 34 specifies that the number of inputs of the image processing filter FtA is "1", referring to the image processing filter FtA represented by the gene of No. 5 and the gene table 82, and thus arranges one sequence element at the input side of the image processing filter FtA. Specifically, the gene translation unit 34 refers to "0.932", which is the numerical value VG of the gene of No. 6, and the gene table 82, and thus specifies that "0.932" is within the range of appearance of the image input layer "in". Thus, the image input layer "in" is arranged at the input-side coupling point of the image processing filter FtA represented by the gene of No. 5. Then, the generation of the sequence on the right side of the image processing sequence Sq shown in FIG. 6 ends. As described above, when all the input-side sequence elements, which are the input-side coupling points coupled to the output-side sequence element, become the image input layer "in", the gene translation unit 34 ends the processing of generating the image processing sequence Sq even if not all the genes of the individual IV1 are used. When all the genes of the individual IV1 are used and not all the input-side sequence elements, which are the input-side coupling points, are the image input layer "in", the gene translation unit 34 sets the image input layer "in" to the remaining input-side sequence element that is not coupled, and thus ends the generation of the image processing sequence Sq.

The image processing sequence Sq1 represented by the individual IV1 has two image input layers "in". The image inputted to one image input layer "in" is image-processed by the image processing filter FtC and subsequently image-processed by the image processing filter FtB, and thus a first processed image is generated. The image inputted to the other image input layer "in" is image-processed by the image processing filter FtA and a second processed image is generated. The first processed image and the second processed image are image-processed by the image processing filter FtE. The final processed image is outputted by the image output layer "out".

As described above, a plurality of image processing sequences Sq can be easily represented, based on the individual IV and the gene table 82.

FIG. 7 shows the reference table 88. The reference table 88 is provided for each learning image LM. FIG. 7 shows the reference table 88 corresponding to a first learning image LM1, of a plurality of learning images LM. The reference table 88 has an identification number for identifying reference data, and reference data. The reference data has a reference sequence RSq, which is a candidate sequence CSq satisfying a predetermined registration condition, of candidate sequences CSq forming at least a part of the evaluation subject image processing sequence Sqa, and a processed image PIM formed by image-processing the learning image LM according to the reference sequence RSq. The processed image PIM is an image associated with the reference sequence RSq and outputted from the node on the last stage of the reference sequence RSq. The candidate sequence CSq is an image processing sequence including an image input layer "in" and an image processing layer coupled continuously from the image input layer "in". The reference sequence RSq is expressed by sequence elements and the coupling relationship between the sequence elements and is expressed, for example, by the individual IV or a part of the individual IV and the gene table 82. The predetermined registration condition is a condition that the candidate sequence CSq is a sequence that is the same as a next routine candidate sequence PSqb, which is at least a part of the next routine image processing sequence Sqb as the image processing sequences forming the next routine sequence set. The next routine candidate sequence PSqb is a sequence including an image input layer "in" and an image processing layer coupled continuously from the image input layer "in". Whether the registration condition is satisfied or not is determined by the registration unit 55.

Figure 8:
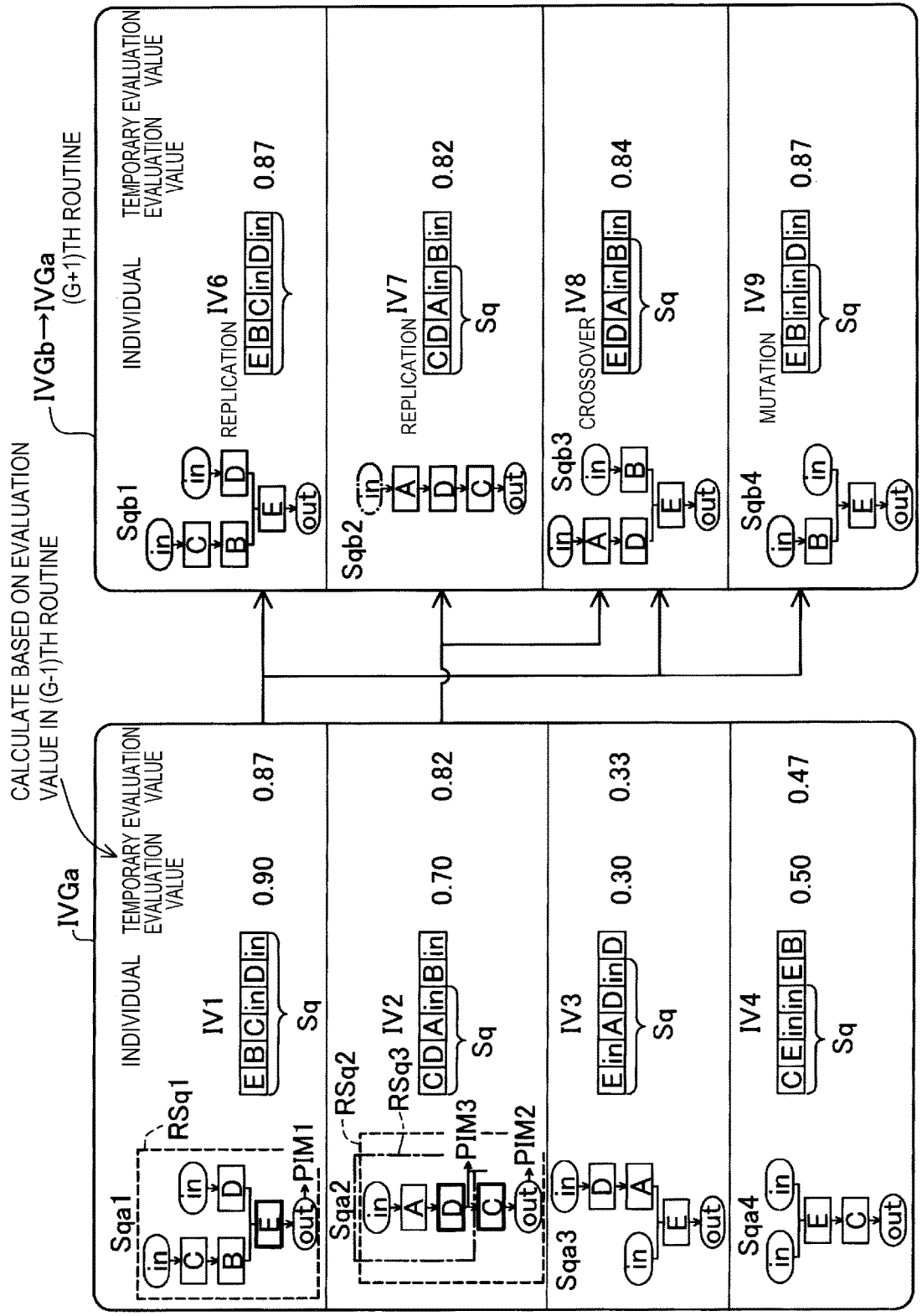
FIG. 8 explains a method for calculating a temporary evaluation value and a method for generating reference data.

FIG. 8 explains a method for calculating the temporary evaluation value and a method for generating the reference data recorded in the reference table 88. In FIG. 8, to facilitate the understanding, the number of loci of the individual IV and the numbers of individuals IV of the first type population IVGa and the second type population IVGb are fewer than the actual numbers. Although numerical values should be allocated to the loci of the individual IV shown in FIG. 8, sequence elements are shown in order to facilitate the understanding. The individuals IV1 to IV9 in FIG. 8 are different individuals from the individuals IV1 to IV10 shown in FIG. 5. The symbol "in" represents the image input layer "in". "A" to "E" represent the image processing filters FtA to FtE, which are image processing layers. The symbol "sq" shown in the individuals IV1 to IV9 represents the range of genes used as the translated image processing sequences Sq. For example, in the case of the individual IV1, an evaluation subject image processing sequence Sqa1 is generated using all the genes. Meanwhile, in the case of the individual IV2, an evaluation subject image processing sequence Sqa2 is generated using the first four genes. In FIG. 8, the processing processes in a G-th routine and a (G+1)th routine of the generation processing for the specified image processing sequence DSq are shown. In this example, "G" is an integer equal to or greater than 2.

The temporary evaluation value calculation unit 48 calculates the temporary evaluation value PEV of the evaluation subject image processing sequence Sqa in the G-th routine, based on the evaluation value EV of the evaluation subject image processing sequence Sqa in the (G−1)th routine.

The individual generation unit 32 replicates the individual IV representing the evaluation subject image processing sequence Sqa where the degree of similarity SD indicated by the temporary evaluation value PEV of the evaluation subject image processing sequence Sqa calculated by the temporary evaluation value calculation unit 48, described later, satisfies a predetermined temporary condition. The individual generation unit 32 thus is maintained as the next routine image processing sequence Sqb. The individual generation unit 32 also replaces the evaluation subject image processing sequence Sqa where the temporary evaluation value PEV does not satisfy the temporary condition, with a new next routine image processing sequence Sqb, by generating the individual IV of the next generation by at least one of crossover and mutation of the individual IV representing the evaluation subject image processing sequence Sqa satisfying the temporary condition. Thus, the image processing sequence Sq where the degree of similarity SD indicated by the temporary evaluation value PEV is high is maintained and the processing time until specifying the specified image processing sequence DSq can thus be reduced further. As for the image processing sequence Sq that does not satisfy the temporary condition, the individual IV of the next generation is generated by at least one of crossover and mutation of the individual IV representing the image processing sequence Sq satisfying the temporary condition. Therefore, the processing time until specifying the specified image processing sequence DSq can be reduced further.

The temporary condition is either a first condition that the degree of similarity SD indicated by the temporary evaluation value PEV is equal to or higher than a temporary threshold, or a second condition that the degree of similarity SD indicated by the temporary evaluation value PEV is within the highest M, where M is an integer equal to or greater than 1. In the example shown in FIG. 8, the temporary condition is the second condition. When generating the second type population IVGb from the first type population IVGa, the individuals IV1, IV2 having the temporary evaluation value PEV within the highest two are replicated and maintained as the individuals IV6, IV7 of the second type population IVGb. The individual generation unit 32 also applies one-point crossover to the individual IV1 and the individual IV2 and thus generates the individual IV8 of the second type population IVGb. The individual generation unit 32 also applies mutation to the individual IV1 and thus generates the individual IV9 of the second type population IVGb.

The registration unit 55 compares evaluation subject image processing sequences Sqa1 to Sqa4 with next routine image processing sequences Sqb1 to Sqb4 and thus specifies a reference sequence RSq, which is at least a part of the evaluation subject image processing sequence Sqa satisfying a predetermined registration condition. In the example shown in FIG. 8, the evaluation subject image processing sequence Sqa1 and the next routine image processing sequence Sqb1 are the same processing sequence. Therefore, the registration unit 55 registers the evaluation subject image processing sequence Sqa1 as a reference sequence RSq1 in the reference table 88. Similarly, the registration unit 55 registers the evaluation subject image processing sequence Sqa2 as a reference sequence RSq2 in the reference table 88. The registration unit 55 also determines that a candidate sequence CSq formed by the image processing filters FtA, FtD coupled continuously from the image input layer "in", of the evaluation subject image processing sequence Sqa2, is the same as the next routine candidate sequence PSqb formed by the image processing filters FtA, FtD coupled continuously from the image input layer "in" of the next routine image processing sequence Sqb3. Thus, the registration unit 55 registers the candidate sequence CSq of the evaluation subject image processing sequence Sqa2 as a reference sequence RSq3 in the reference table 88.

The registration unit 55 stores images outputted from the node on the last stage of the reference sequences RSq1 to RSq3 as processed images PIM1 to PIM3 in association with the reference sequences RSq1 to RSq3 in the reference table 88, in the process in which the image processing unit 40 image-processes the learning image LM, using the evaluation subject image processing sequences Sqa1 to Sqa4 of the first type population IVGa.

In the (G+1)th routine, where the second type population IVGb is used as the first type population IVGa, the temporary evaluation value calculation unit 48, before calculating the evaluation value EV, calculates the temporary evaluation value PEV of the image processing sequence Sq represented by each of the individuals IV6 to IV9 of the first type population IVGa, using the following equation (1):

[Math. 1]

$$PEV = \frac{\sum_i (w_i EV_i)}{\sum_i w_i} \quad (1)$$

In this equation, Wi is the rate of succession of the genes forming the individual IV of the previous generation, that is, the rate of coincidence between the previous image processing sequence Sqam and the current image processing sequence Sqan, and EVi is the evaluation value EV of the individual IV of the previous generation. The rate of coincidence is found by comparing the genes of individuals IV representing image processing sequences Sq, and the comparison includes a gene that is not used as the image processing sequences Sq. That is, the rate of coincidence is the rate of coincidence between the genes representing the sequence elements of the individual IV of the current generation Gm and the genes representing the sequence elements of the individual IV of the next generation Gn generated using the individual IV of the current generation Gm.

For example, the image processing sequence Sqb3, which is the current image processing sequence Sqan, is generated by crossover to the image processing sequence Sqa1 and the image processing sequence Sqa2. In this case, the temporary evaluation value PEV of the image processing sequence Sqb3 is "0.84", based on the following equation (2):

[Math. 2]

$$PEV = (\frac{1}{6} \times 0.87 + \frac{5}{6} \times 0.82)/(\frac{1}{6} + \frac{5}{6}) = 0.84 \quad (2)$$

Also, for example, the image processing sequence Sqb4, which is the current image processing sequence Sqan, is generated by mutating one gene of the image processing sequence Sqa1. In this case, the temporary evaluation value PEV of the image processing sequence Sqb4 is "0.87", based on the following equation (3):

[Math. 3]

$$PEV = (\frac{5}{6} \times 0.87)/(\frac{5}{6}) = 0.87 \quad (3)$$

That is, the temporary evaluation value of the image processing sequence Sqb4 generated by the mutation is the same as the evaluation value EV of the image processing sequence Sqa1 serving as the base of generation.

As described above, the temporary evaluation value PEV from the second routine onward is calculated, using the rate of coincidence between the previous image processing sequence Sqam and the current image processing sequence Sqan. Thus, the discrepancy between the temporary evaluation value PEV and the evaluation value EV can be reduced and therefore the processing time until specifying the specified image processing sequence DSq can be reduced further. Also, as described above, the rate of coincidence can be easily calculated, using the individual IV of the current generation Gm and the individual IV of the next generation Gn.

Figure 9:
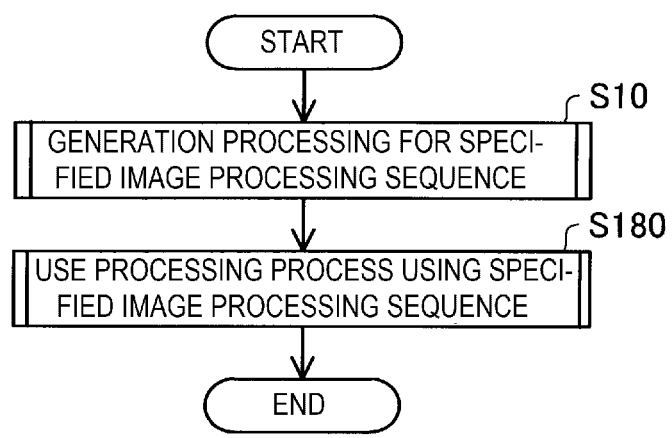
FIG. 9 is a flowchart showing processing executed by a generation device.

FIG. 9 is a flowchart showing processing executed by the generation device 20. This processing includes a generation processing process for the specified image processing sequence DSq, which is step S10, and a use processing process using the specified image processing sequence DSq, which is step S180 executed after step S10. The generation processing process for the specified image processing sequence DSq is executed by the sequence generation processing function of the generation device 20. The use processing process is executed by the image processing function of the generation device 20.

Figure 10:
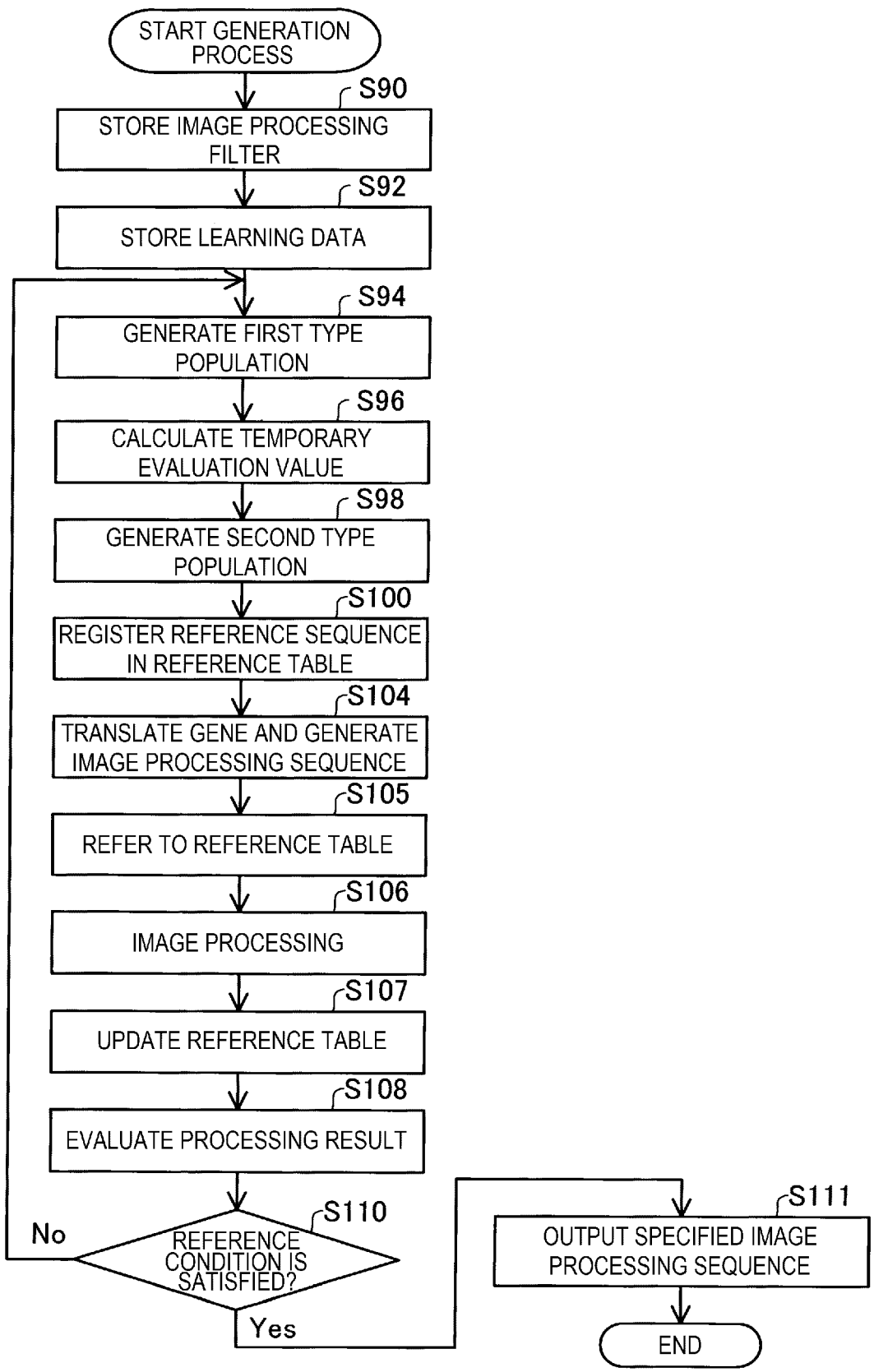
FIG. 10 is a flowchart showing details of a generation processing process of step S10.

FIG. 10 is a flowchart showing details of the generation processing process of step S10. As shown in FIG. 10, in step S90, the storage device 70 stores a plurality of image processing filters as the image filter group 80. Step S90 is executed by the user inputting, to the generation device 20, a plurality of image processing filters to be candidates used in the specified image processing sequence DSq. In step S92, the learning data 74 formed of a plurality of learning sets SM, each learning set SM being formed of the learning image LM and the target image TM, is prepared and stored in the storage device 70. Step S92 is executed by the user inputting a plurality of learning sets SM to the generation device 20. The order of step S90 and step S92 is not limited to this example.

Next, in step S94, the individual generation unit 32 generates the first type population IVGa representing the evaluation subject image processing sequence Sqa, which is a subject of calculation of the evaluation value EV. The first type population IVGa is a sequence set formed of a plurality of image processing sequences Sq having different combinations of sequence elements from each other. In step S94 in the first routine, the individual generation unit 32 uses either the first method of randomly generating the image processing sequence Sq or the second method using the past specified image processing sequence DSq, as described above. In this embodiment, in step S94 in the first routine, the individual generation unit 32 employs the first method of randomly arranging a numerical value down to the third decimal place from 0 to 1 as a gene at each locus of the individual IV, and thus generates a plurality of individuals IV. In step S94 from the second routine onward, the individual generation unit 32 uses the second type population IVGb generated in step S98, described later, as the first type population IVGa, and thus generates the first type population IVGa.

Next, in step S96, the temporary evaluation value calculation unit 48 calculates the temporary evaluation value PEV for each of the plurality of evaluation subject image processing sequences Sqa represented by the first type population IVGa, before calculating the evaluation value EV. In step S96 in the first routine, the temporary evaluation value calculation unit 48 calculates the temporary evaluation value PEV by one of the first calculation method and the second calculation method, described above. In this embodiment, since the first method of randomly generating the evaluation subject image processing sequence Sqa is used in step S94, the temporary evaluation value calculation unit 48 sets a random value as the temporary evaluation value PEV for the evaluation subject image processing sequence Sqa. In step S96 from the second routine onward, the temporary evaluation value calculation unit 48 calculates the temporary evaluation value PEV, using the previous evaluation value EVM and the rate of coincidence, as described above.

Next, in step S98, the individual generation unit 32 generates the second type population IVGb formed of a plurality of individuals IV of the next generation, as described above, using the degree of similarity SD indicated by the temporary evaluation value PEV, and thus generates a new next routine image processing sequence Sqb.

Next, in step S100, the registration unit 55 registers the reference sequence RSq forming reference data, in the reference table 88. The method for registering the reference sequence RSq is as described above with reference to FIG. 8.

Next, in step S104, the gene translation unit 34 translates each individual IV of the first type population IVGa generated in step S94 and thus generates a plurality of evaluation subject image processing sequences Sqa. Step S104 may be executed at any point after step S94 and may be executed, for example, immediately after step S94.

Next, in step S105, the image processing unit 40 determines whether there is a reference sequence RSq that is the same as at least a part of the evaluation subject image processing sequence Sqa or not, referring to the reference table 88. This step S105 may be omitted in the first routine. From the second routine onward, that is, when the second type population IVGb representing the next routine sequence set is used as the first type population IVGa representing the sequence set that is a subject of calculation of the evaluation value EV in this routine, the image processing unit 40 compares the reference sequence RSq in the reference table 88 stored in the storage device 70 and each of the plurality of evaluation subject image processing sequences Sqa forming the sequence set. The image processing unit 40 then specifies a sequence that is the same sequence as the reference sequence RSq and that is formed of the image input layer "in" and a sequence element coupled continuously from the image input layer "in", of the evaluation subject image processing sequence Sqa that is a subject of calculation of the evaluation value EV. The image processing unit 40 also specifies the processed image PIM associated with the reference sequence RSq that is the same as the specified sequence.

For example, in FIG. 8, when the image processing sequences Sqb1, Sqb2 represented by the individuals IV6, IV7 are used as subjects of calculation of the evaluation value EV, the individuals IV6, IV7 are the same as the individuals IV1, IV2 registered as the reference sequences RSq1, RSq2 in the reference table 88 and therefore the image processing unit 40 specifies that the image processing sequences Sqb1, Sqb2 of the individuals IV6, IV7 are the same as the reference sequences RSq1, RSq2, and also specifies the processed images PIM1, PIM2 associated with the reference sequences RSq1, RSq2. Also, for example, in FIG. 8, when the image processing sequence Sqb3 represented by the individual IV8 is used as a subject of calculation of the evaluation value EV, the image processing unit 40 specifies that "the image input layer "in", the image processing filter FtA, the image processing filter FtD", which is a part of the image processing sequence Sqb3 represented by the individual IV8, is the same as the reference sequence RSq3, and also specifies the processed image PIM3 associated with the reference sequence RSq3.

Next, as shown in FIG. 10, in step S106, the image processing unit 40 image-processes the learning image LM according to each of the plurality of evaluation subject image processing sequences Sqa and generates the output image PM, which is the image after the image processing, for each of the plurality of evaluation subject image processing sequences Sqa. In step S106, for the same sequence as the reference sequence RSq specified in step S105, of the evaluation subject image processing sequence Sqa, the image processing unit 40 generates the output image PM based on the image processing sequence Sq, using the processed image PIM associated with the reference sequence RSq. That is, for the same sequence as the reference sequence RSq, image processing is not executed and the processed image PIM is used as the image outputted from the last stage of the sequence. For example, when image-processing the learning image LM according to the image processing sequence Sqb1 shown in FIG. 8, the image processing sequence Sqb1 is the same as the reference sequence RSq1 and therefore the processed image PIM1 associated with the reference sequence RSq1 is used as the output image PM. Also, for example, when image-processing the learning image LM according to the image processing sequence Sqb3 shown in FIG. 8, image processing is not executed for the same sequence as the reference sequence RSq3 and the processed image PIM3 associated with the reference sequence RSq3 is used, and the rest of the image processing is executed. That is, in the image processing sequence Sqb3, the image processing unit 40 inputs the processed image PIM3 to the image processing filter FtE. Also, in the image processing sequence Sqb3, the image processing unit 40 inputs the learning image LM to the image input layer "in" of the sequence on the right side.

As shown in FIG. 10, in step S107 after step S106, the registration unit 55 uses, as the processed image PIM, an image outputted from at least a part of the image processing sequence Sq that is the same as the reference sequence RSq registered in step S100, and stores this image as reference data, and thus updates the reference table 88.

Next, in step S108, the evaluation value calculation unit 47 compares the output image PM outputted in step S106 and the target image TM associated with the learning image LM and thus calculates the evaluation value EV. Next, in step S110, the specification unit 49 specifies the evaluation subject image processing sequence Sqa satisfying a predetermined reference condition, using a plurality of final evaluation values EV. When there is no evaluation subject image processing sequence Sqa satisfying the predetermined reference condition, the processing from step S94 onward is repeatedly executed until the evaluation subject image processing sequence Sqa satisfying the predetermined reference condition is specified.

Meanwhile, when the evaluation subject image processing sequence Sqa satisfying the predetermined reference condition is specified in step S110, the specification unit 49 in step S111 outputs the evaluation subject image processing sequence Sqa satisfying the reference condition as the specified image processing sequence DSq. The outputted specified image processing sequence DSq is stored in the storage device 70.

Figure 11:
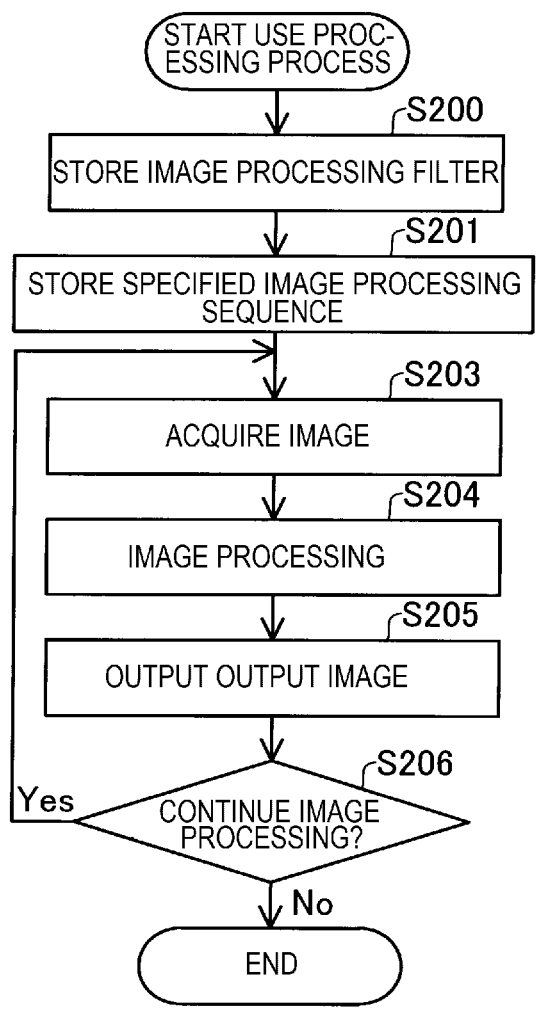
FIG. 11 is a flowchart showing a use processing process.

FIG. 11 is a flowchart showing the use processing process. The use processing process is executed after the specified image processing sequence DSq is specified by the generation process in FIG. 10. First, in step S200, the storage device 70 stores a plurality of image processing filters accepted by the input unit 150, as the image filter group 80. The plurality of image processing filters of the image filter group 80 stored in the use processing process may be only the image processing filters used in the specified image processing sequence DSq. When the use processing process and the generation process in FIG. 10 are executed by the same generation device 20, step S200 can be omitted and the image filter group 80 stored in the storage device 70 in step S90 shown in FIG. 10 can be used.

Next, in step S201, the storage device 70 stores the specified image processing sequence DSq outputted in step S111 in FIG. 10. The order of step S200 and step S201 is not limited to the above example.

Next, in step S203, the image processing unit 40 reads out and thus acquires an image that is stored in the storage device 70 via the input unit 150 and that is a subject of image processing according to the specified image processing sequence DSq. The image acquired in step S203 is, for example, a picked-up image of a subject of the same type as the learning image LM. When there are a plurality of images to be subjects of image processing, the image processing unit 40 may read out and thus acquire one of a plurality of images stored in advance in the storage device 70 or may acquire a subject image from the image pickup device 200 each time at the timing of executing image processing, described later.

Next, in step S204, the image processing unit 40 executes the image processing using the specified image processing sequence DSq, on the image acquired in step S203. That is, the image processing unit 40 executes the image processing of the image, using the image processing filter stored in the image filter group 80 in the storage device 70, according to the order represented by the specified image processing sequence DSq.

Next, in step S205, the output image PM, which is the image after the image processing using the specified image processing sequence DSq, is outputted. Step S205 is executed, for example, by storing the output image PM in the storage device 70 or by displaying the output image PM on the display unit 160.

Next, in step S206, the image processing unit 40 determines whether to continue the image processing using the specified image processing sequence DSq or not. For example, when information indicating the continuation of the image processing is inputted by the user or when an unprocessed image that is a subject of the image processing is left in the storage device 70, the image processing unit 40 determines that the image processing is to be continued. When the image processing is to be continued, the processing from step S203 onward is executed again. Meanwhile, when information indicating the end of the image processing is inputted by the user or when an unprocessed image that is a subject of the image processing is not left in the storage device 70, the image processing unit 40 ends the use processing process.

According to the above embodiment, as shown in FIG. 8, the next routine set to be used in the next routine is generated using the temporary evaluation value PEV, and the reference sequence RSq that is the same as at least a part of the image processing sequence Sq to be used in the next routine set and the processed image PIM image-processed according to the reference sequence RSq are stored in the storage device 70. Thus, when executing image processing according to the image processing sequence of the next routine set, the processed image PIM can be used. Thus, the processing time of image processing can be reduced and therefore the processing time until specifying the specified image processing sequence DSq can be reduced. Also, since the next routine set is generated using the temporary evaluation value PEV, the image processing sequence Sq to be used for the image processing in the next routine can be specified. Therefore, the processed image PIM to be used in the next routine can be efficiently stored in the storage device 70. Thus, an image that is not used in the next routine can be restrained from being stored in the storage device 70.

B. OTHER EMBODIMENTS

B-1. Other Embodiment 1

In the above embodiment, the image processing of the learning image LM according to a plurality of image processing sequences Sq represented by a plurality of individuals IV belonging to one generation G is sequentially executed by one generation device 20. However, the image processing may be executed in parallel, using a plurality of generation devices 20.

B-2. Other Embodiment 2

In the above embodiment, the image processing sequence Sq is represented by the individual IV and the gene table 82. However, this is not limiting. For example, the image processing sequence Sq may be represented by a plurality of sequence elements and a table prescribing the coupling relationship between the sequence elements.

B-3. Other Embodiment 3

The temporary condition for generating each next routine image processing sequence Sqb in the above embodiment is either the first condition that the degree of similarity SD indicated by the temporary evaluation value PEV is equal to or higher than a temporary threshold, or the second condition that the degree of similarity SD indicated by the temporary evaluation value PEV is within the highest M, where M is an integer equal to or greater than 1. Preferably, the temporary threshold and the numerical value M of the highest M may be set to be a lower value than a value used when generating the next generation Gn from the current generation Gm, based on an ordinary genetic algorithm. Thus, the probability that the image processing sequence Sq where the evaluation value EV calculated using the result of actual image processing is high is not replicated to the next generation Gn, can be reduced.

C. OTHER ASPECTS

The present disclosure is not limited to the above embodiment and can be implemented according to various aspects without departing from the spirit and scope of the present disclosure. For example, the present disclosure can be implemented according to the aspects described below. A technical feature in the embodiment corresponding to a technical feature in the aspects described below can be replaced or combined where appropriate in order to solve a part or all of the problems of the present disclosure or in order to achieve a part or all of the effects of the present disclosure. The technical feature can be deleted where appropriate, unless described as essential in the present specification.

(1) According to a first aspect of the present disclosure, a method for generating an image processing sequence is provided. The method for generating the image processing sequence includes: (a) generating a sequence set formed of a plurality of image processing sequences, the image processing sequence representing a combination of (i) an image input layer to input an image, (ii) at least one of a plurality of image processing layers, and (iii) an image output layer to output the image after image processing, as sequence elements, the combination varying between the plurality of the image processing sequences; (b) image-processing a learning image according to each of the plurality of the image processing sequences, and generating an output image that is an image after the image processing for each of the plurality of the image processing sequences; (c) comparing the output image and a target image serving as a target associated with the learning image, and calculating an evaluation value indicating a degree of similarity between the output image and the target image, for each of the plurality of the image processing sequences; (d) calculating a temporary evaluation value as an estimate value of the evaluation value for each of the plurality of the image processing sequences generated in the (a), before the (c) of calculating the evaluation value; (e) maintaining the image processing sequence where the degree of similarity indicated by the temporary evaluation value satisfies a predetermined temporary condition, and replacing the image processing sequence that does not satisfy the temporary condition with the image processing sequence that is new, and thus generating a next routine sequence set as the sequence set used in a next routine; (f) storing a reference sequence and a processed image that is image-processed according to the reference sequence, in association with each other in a storage device, the reference sequence being a candidate sequence satisfying a predetermined registration condition, of candidate sequences that are at least a part of the image processing sequence generated in the (a) and that include the image input layer and the image processing layer coupled continuously from the image input layer; and (g) specifying the image processing sequence satisfying a predetermined reference condition, using a plurality of the evaluation values corresponding respectively to the plurality of the image processing sequences. The routine of the (a) to the (g) is repeatedly executed until the image processing sequence satisfying the reference condition is specified. In the (f), the registration condition is a condition that the candidate sequence is a sequence that is the same as a next routine candidate sequence which is at least a part of the image processing sequence forming the next routine sequence set and which includes the image input layer and the image processing layer coupled continuously from the image input layer. In the (b), when the next routine sequence set is used as the sequence set in the routine of this time, the reference sequence stored in the storage device is compared with each of the plurality of the image processing sequences forming the sequence set, and with respect to a sequence that is the same as the reference sequence and that is formed by the image input layer and the sequence element coupled continuously from the image input layer, of the image processing sequences, the output image according to the image processing sequence is generated, using the processed image associated with the reference sequence. According to this aspect, the next routine set to be used in the next routine is generated using the temporary evaluation value, and the reference sequence that is the same as at least a part of the image processing sequence to be used in the next routine set and the processed image that is image-processed according to the reference sequence are stored in the storage device. Therefore, when executing image processing according to the image processing sequence of the next routine set, the processed image can be used. Thus, the processing time of the image processing can be reduced and therefore the processing time until specifying the specified image processing sequence can be reduced. Also, as the next routine set is generated using the temporary evaluation value, the image processing sequence to be used for the image processing in the next routine can be specified and therefore the processed image to be used in the next routine can be efficiently stored in the storage device. Thus, an image that is not used in the next routine can be restrained from being stored in the storage device.

(2) In the above aspect, in the (d), in the routine of a first time, the temporary evaluation value may be calculated by one of setting a random value as the temporary evaluation value, and setting, as the temporary evaluation value, a past evaluation value as the evaluation value calculated in the (c) in the method for generating the image processing sequence executed in the past. According to this aspect, the temporary evaluation value in the first routine can be easily set.

(3) In the above aspect, in the (d), in the routine from a second time onward, the temporary evaluation value may be calculated, using a previous evaluation value as the evaluation value calculated in the (c) in the routine of a previous time, and a rate of coincidence between a previous image processing sequence as the image processing sequence that is a base of calculation of the previous evaluation value and the image processing sequence that is a subject of calculation of the temporary evaluation value. According to this aspect, the discrepancy between the temporary evaluation value and the evaluation value can be reduced and therefore the processing time until specifying the specified image processing sequence can be reduced further.

(4) In the above aspect, in the (b), each of the plurality of the image processing sequences may be represented by an individual formed by sequencing a plurality of genes corresponding respectively to the image input layer and the image processing layer, and a gene table prescribing a coupling relationship between the sequence elements. In the (e), replacing the image processing sequence that does not satisfy the temporary condition with the image processing sequence that is new may be executed by generating the individual of a next generation by at least one of crossover and mutation of the individual of a current generation representing the image processing sequence satisfying the temporary condition. The rate of coincidence may be the rate of coincidence between the individual of the current generation and the individual of the next generation generated using the individual of the current generation. According to this aspect, for the image processing sequence that does not satisfy the temporary condition, the individual of the next generation is generated by at least one of crossover and mutation of the individual representing the image processing sequence satisfying the temporary condition. Therefore, the processing time until specifying the specified image processing sequence can be reduced further. Also, according to this aspect, the rate of coincidence can be easily calculated, using the individual of the current generation and the individual of the next generation.

(5) In the above aspect, in the (d), in the routine from the second time onward, the temporary evaluation value may be calculated by adding a random value to a value calculated using the previous evaluation value and the rate of coincidence. According to this aspect, as the random value is added, the discrepancy between the temporary evaluation value and the evaluation value can be restrained.

(6) According to a second aspect of the present disclosure, a generation device for an image processing sequence is provided. The generation device includes: a sequence generation unit generating a sequence set formed of a plurality of image processing sequences, the image processing sequence representing a combination of (i) an image input layer to input an image, (ii) at least one of a plurality of image processing layers, and (iii) an image output layer to output the image after image processing, as sequence elements, the combination varying between the plurality of the image processing sequences; an image processing unit image-processing a learning image according to each of the plurality of the image processing sequences, and generating an output image that is an image after the image processing for each of the plurality of the image processing sequences; an evaluation value calculation unit comparing the output image and a target image serving as a target associated with the learning image, and calculating an evaluation value indicating a degree of similarity between the output image and the target image, for each of the plurality of the image processing sequences; and a temporary evaluation value calculation unit calculating a temporary evaluation value as an estimate value of the evaluation value for each of the plurality of the image processing sequences. The sequence generation unit maintains the image processing sequence where the degree of similarity indicated by the temporary evaluation value satisfies a predetermined temporary condition, and replaces the image processing sequence that does not satisfy the temporary condition with the image processing sequence that is new, and thus generates a next routine sequence set as the sequence set used in a next routine. The generation device also includes: a registration unit storing a reference sequence and a processed image that is image-processed according to the reference sequence, in association with each other in a storage device, the reference sequence being a candidate sequence satisfying a predetermined registration condition, of candidate sequences that are at least a part of the image processing sequence forming the sequence set generated by the sequence generation unit and that include the image input layer and the image processing layer coupled continuously from the image input layer; and a specification unit specifying the image processing sequence satisfying a predetermined reference condition, using the evaluation values corresponding respectively to the plurality of the image processing sequences. The registration condition is a condition that the candidate sequence is a sequence that is the same as a next routine candidate sequence which is at least a part of the image processing sequence forming the next routine sequence set and which includes the image input layer and the image processing layer coupled continuously from the image input layer. When the next routine sequence set is used as the sequence set in the routine of this time, the image processing unit compares the reference sequence stored in the storage device with each of the plurality of the image processing sequences forming the sequence set, and generates the output image according to the image processing sequence, using the processed image associated with the reference sequence, with respect to a sequence that is the same as the reference sequence and that is formed by the image input layer and the sequence element coupled continuously from the image input layer, of the image processing sequences. According to this aspect, the next routine set to be used in the next routine is generated using the temporary evaluation value, and the reference sequence that is the same as at least a part of the image processing sequence to be used in the next routine set and the processed image that is image-processed according to the reference sequence are stored in the storage device. Therefore, when executing image processing according to the image processing sequence of the next routine set, the processed image can be used. Thus, the processing time of the image processing can be reduced and therefore the processing time until specifying the specified image processing sequence can be reduced. Also, as the next routine set is generated using the temporary evaluation value, the image processing sequence to be used for the image processing in the next routine can be specified and therefore the processed image to be used in the next routine can be efficiently stored in the storage device. Thus, an image that is not used in the next routine can be restrained from being stored in the storage device.

(7) According to a third aspect of the present disclosure, a computer program is provided. The computer program causes a computer to execute: (a) a function of generating a sequence set formed of a plurality of image processing sequences, the image processing sequence representing a combination of (i) an image input layer to input an image, (ii) at least one of a plurality of image processing layers, and (iii) an image output layer to output the image after image processing, as sequence elements, the combination varying between the plurality of the image processing sequences; (b) a function of image-processing a learning image according to each of the plurality of the image processing sequences, and generating an output image that is an image after the image processing for each of the plurality of the image processing sequences; (c) a function of comparing the output image and a target image serving as a target associated with the learning image, and calculating an evaluation value indicating a degree of similarity between the output image and the target image, for each of the plurality of the image processing sequences; (d) a function of calculating a temporary evaluation value as an estimate value of the evaluation value for each of the plurality of the image processing sequences generated by the function (a), before executing the function (c) of calculating the evaluation value; (e) a function of maintaining the image processing sequence where the degree of similarity indicated by the temporary evaluation value satisfies a predetermined temporary condition, and replacing the image processing sequence that does not satisfy the temporary condition with the image processing sequence that is new, and thus generating a next routine sequence set as the sequence set used in a next routine; (f) a function of storing a reference sequence and a processed image that is image-processed according to the reference sequence, in association with each other in a storage device, the reference sequence being a candidate sequence satisfying a predetermined registration condition, of candidate sequences that are at least a part of the image processing sequence generated by the function (a) and that include the image input layer and the image processing layer coupled continuously from the image input layer; and (g) a function of specifying the image processing sequence satisfying a predetermined reference condition, using a plurality of the evaluation values corresponding respectively to the plurality of the image processing sequences. The routine of the function (a) to the function (g) is repeatedly executed until the image processing sequence satisfying the reference condition is specified. In the function (f), the registration condition is a condition that the candidate sequence is a sequence that is the same as a next routine candidate sequence which is at least a part of the image processing sequence forming the next routine sequence set and which includes the image input layer and the image processing layer coupled continuously from the image input layer. When the next routine sequence set is used as the sequence set in the routine of this time, the function (b) compares the reference sequence stored in the storage device with each of the plurality of the image processing sequences forming the sequence set, and generates the output image according to the image processing sequence, using the processed image associated with the reference sequence, with respect to a sequence that is the same as the reference sequence and that is formed by the image input layer and the sequence element coupled continuously from the image input layer, of the image processing sequences. According to this aspect, the next routine set to be used in the next routine is generated using the temporary evaluation value, and the reference sequence that is the same as at least a part of the image processing sequence to be used in the next routine set and the processed image that is image-processed according to the reference sequence are stored in the storage device.

Therefore, when executing image processing according to the image processing sequence of the next routine set, the processed image can be used. Thus, the processing time of the image processing can be reduced and therefore the processing time until specifying the specified image processing sequence can be reduced. Also, as the next routine set is generated using the temporary evaluation value, the image processing sequence to be used for the image processing in the next routine can be specified and therefore the processed image to be used in the next routine can be efficiently stored in the storage device. Thus, an image that is not used in the next routine can be restrained from being stored in the storage device.

The present disclosure can also be implemented according to various other aspects than the above. For example, the present disclosure can be implemented in the form of a non-transitory storage medium storing the computer program.

What is claimed is:

1. A method for generating an image processing sequence, the method comprising:
(a) generating a sequence set formed of a plurality of image processing sequences, the image processing sequence representing a combination of (i) an image input layer to input an image, (ii) at least one of a plurality of image processing layers, and (iii) an image output layer to output the image after image processing, as sequence elements, the combination varying between the plurality of the image processing sequences;
(b) image-processing a learning image according to each of the plurality of the image processing sequences, and generating an output image that is an image after the image processing for each of the plurality of the image processing sequences;
(c) comparing the output image and a target image serving as a target associated with the learning image, and calculating an evaluation value indicating a degree of similarity between the output image and the target image, for each of the plurality of the image processing sequences;
(d) calculating a temporary evaluation value as an estimate value of the evaluation value for each of the plurality of the image processing sequences generated in the (a), before the (c) of calculating the evaluation value;
(e) maintaining the image processing sequence where the degree of similarity indicated by the temporary evaluation value satisfies a predetermined temporary condition, and replacing the image processing sequence that does not satisfy the temporary condition with the image processing sequence that is new, and thus generating a next routine sequence set as the sequence set used in a next routine;
(f) storing a reference sequence and a processed image that is image-processed according to the reference sequence, in association with each other in a storage device, the reference sequence being a candidate sequence satisfying a predetermined registration condition, of candidate sequences that are at least a part of the image processing sequence generated in the (a) and that include the image input layer and the image processing layer coupled continuously from the image input layer; and
(g) specifying the image processing sequence satisfying a predetermined reference condition, using a plurality of the evaluation values corresponding respectively to the plurality of the image processing sequences, wherein the routine of the (a) to the (g) is repeatedly executed until the image processing sequence satisfying the reference condition is specified, in the (f), the registration condition is a condition that the candidate sequence is a sequence that is the same as a next routine candidate sequence which is at least a part of the image processing sequence forming the next routine sequence set and which includes the image input layer and the image processing layer coupled continuously from the image input layer, in the (b), when the next routine sequence set is used as the sequence set in the routine of this time, the reference sequence stored in the storage device is compared with each of the plurality of the image processing sequences forming the sequence set, and with respect to a sequence that is the same as the reference sequence and that is formed by the image input layer and the sequence element coupled continuously from the image input layer, of the image processing sequences, the output image according to the image processing sequence is generated, using the processed image associated with the reference sequence.

2. The method for generating the image processing sequence according to claim 1, wherein in the (d), in the routine of a first time, the temporary evaluation value is calculated by one of setting a random value as the temporary evaluation value, and setting, as the temporary evaluation value, a past evaluation value as the evaluation value calculated in the (c) in the method for generating the image processing sequence executed in the past.

3. The method for generating the image processing sequence according to claim 1, wherein in the (d), in the routine from a second time onward, the temporary evaluation value is calculated, using a previous evaluation value as the evaluation value calculated in the (c) in the routine of a previous time, and a rate of coincidence between a previous image processing sequence as the image processing sequence that is a base of calculation of the previous evaluation value and the image processing sequence that is a subject of calculation of the temporary evaluation value.

4. The method for generating the image processing sequence according to claim 3, wherein in the (b), each of the plurality of the image processing sequences is represented by an individual formed by sequencing a plurality of genes corresponding respectively to the image input layer and the image processing layer, and a gene table prescribing a coupling relationship between the sequence elements, in the (e), replacing the image processing sequence that does not satisfy the temporary condition with the image processing sequence that is new is executed by generating the individual of a next generation by at least one of crossover and mutation of the individual of a current generation representing the image processing sequence satisfying the temporary condition, and the rate of coincidence is the rate of coincidence between the individual of the current generation and the individual of the next generation generated using the individual of the current generation.

5. The method for generating the image processing sequence according to claim 3, wherein in the (d), in the routine from the second time onward, the temporary evaluation value is calculated by adding a random value to a value calculated using the previous evaluation value and the rate of coincidence.

6. The method for generating the image processing sequence according to claim 1, wherein in the (e), the temporary condition is one of (i) a condition that the degree of similarity is equal to or higher than a predetermined temporary threshold, and (ii) a condition that the degree of similarity is within highest M, where M is an integer equal to or greater than 1.

7. A generation device for an image processing sequence, the generation device comprising:

a sequence generation unit generating a sequence set formed of a plurality of image processing sequences, the image processing sequence representing a combination of (i) an image input layer to input an image, (ii) at least one of a plurality of image processing layers, and (iii) an image output layer to output the image after image processing, as sequence elements, the combination varying between the plurality of the image processing sequences;

an image processing unit image-processing a learning image according to each of the plurality of the image processing sequences, and generating an output image that is an image after the image processing for each of the plurality of the image processing sequences;

an evaluation value calculation unit comparing the output image and a target image serving as a target associated with the learning image, and calculating an evaluation value indicating a degree of similarity between the output image and the target image, for each of the plurality of the image processing sequences; and a temporary evaluation value calculation unit calculating a temporary evaluation value as an estimate value of the evaluation value for each of the plurality of the image processing sequences, the sequence generation unit maintaining the image processing sequence where the degree of similarity indicated by the temporary evaluation value satisfies a predetermined temporary condition, and replacing the image processing sequence that does not satisfy the temporary condition with the image processing sequence that is new, and thus generating a next routine sequence set as the sequence set used in a next routine, the generation device further comprising:

a registration unit storing a reference sequence and a processed image that is image-processed according to the reference sequence, in association with each other in a storage device, the reference sequence being a candidate sequence satisfying a predetermined registration condition, of candidate sequences that are at least a part of the image processing sequence forming the sequence set generated by the sequence generation unit and that include the image input layer and the image processing layer coupled continuously from the image input layer; and a specification unit specifying the image processing sequence satisfying a predetermined reference condition, using the evaluation values corresponding respectively to the plurality of the image processing sequences, wherein the registration condition is a condition that the candidate sequence is a sequence that is the same as a next routine candidate sequence which is at least a part of the image processing sequence forming the next routine sequence set and which includes the image input layer and the image processing layer coupled continuously from the image input layer, and when the next routine sequence set is used as the sequence set in the routine of this time, the image processing unit compares the reference sequence stored in the storage device with each of the plurality of the image processing sequences forming the sequence set, and generates the output image according to the image processing sequence, using the processed image associated with the reference sequence, with respect to a sequence that is the same as the reference sequence and that is formed by the image input layer and the sequence element coupled continuously from the image input layer, of the image processing sequences.

8. A non-transitory computer-readable storage medium storing a computer program, the computer program causing a computer to execute:
   (a) a function of generating a sequence set formed of a plurality of image processing sequences, the image processing sequence representing a combination of (i) an image input layer to input an image, (ii) at least one of a plurality of image processing layers, and (iii) an image output layer to output the image after image processing, as sequence elements, the combination varying between the plurality of the image processing sequences;
   (b) a function of image-processing a learning image according to each of the plurality of the image processing sequences, and generating an output image that is an image after the image processing for each of the plurality of the image processing sequences;
   (c) a function of comparing the output image and a target image serving as a target associated with the learning image, and calculating an evaluation value indicating a degree of similarity between the output image and the target image, for each of the plurality of the image processing sequences;
   (d) a function of calculating a temporary evaluation value as an estimate value of the evaluation value for each of the plurality of the image processing sequences generated by the function (a), before executing the function (c) of calculating the evaluation value;
   (e) a function of maintaining the image processing sequence where the degree of similarity indicated by the temporary evaluation value satisfies a predetermined temporary condition, and replacing the image processing sequence that does not satisfy the temporary condition with the image processing sequence that is new, and thus generating a next routine sequence set as the sequence set used in a next routine;
   (f) a function of storing a reference sequence and a processed image that is image-processed according to the reference sequence, in association with each other in a storage device, the reference sequence being a candidate sequence satisfying a predetermined registration condition, of candidate sequences that are at least a part of the image processing sequence generated by the function (a) and that include the image input layer and the image processing layer coupled continuously from the image input layer; and
   (g) a function of specifying the image processing sequence satisfying a predetermined reference condition, using a plurality of the evaluation values corresponding respectively to the plurality of the image processing sequences, wherein
   the routine of the function (a) to the function (g) is repeatedly executed until the image processing sequence satisfying the reference condition is specified,
   in the function (f), the registration condition is a condition that the candidate sequence is a sequence that is the same as a next routine candidate sequence which is at least a part of the image processing sequence forming the next routine sequence set and which includes the image input layer and the image processing layer coupled continuously from the image input layer, and
   when the next routine sequence set is used as the sequence set in the routine of this time, the function (b) compares the reference sequence stored in the storage device with each of the plurality of the image processing sequences forming the sequence set, and generates the output image according to the image processing sequence, using the processed image associated with the reference sequence, with respect to a sequence that is the same as the reference sequence and that is formed by the image input layer and the sequence element coupled continuously from the image input layer, of the image processing sequences.

\* \* \* \* \*